United States Patent Office 3,416,938
Patented Dec. 17, 1968

3,416,938
MgO-Zr-O₂ FUSED CAST REFRACTORY
Allen M. Alper and Robert N. McNally, Corning, N.Y., assignors to Corhart Refractories Company, Louisville, Ky., a corporation of Delaware
No Drawing. Continuation-in-part of application Ser. No. 522,823, Jan. 25, 1966. This application Sept. 5, 1967, Ser. No. 665,232
8 Claims. (Cl. 106—57)

ABSTRACT OF THE DISCLOSURE

Basic fused cast refractory consisting of, analytically by weight, 1 to 30% $ZrO_2$, not more than 5% $SiO_2$, 0 to 20% FeO, 0 to 10% $B_2O_3$, 0 to 3% of $Al_2O_3$, $Cr_2O_3$ and mixtures thereof, and the balance being MgO in an amount of at least 70% plus incidental impurities in an amount less than 1%. Refractory useful for lining basic oxygen steelmaking furnaces or vessels.

CROSS-REFERENCE TO RELATED APPLICATION

This is a continuation-in-part of application Ser. No. 522,823, filed Jan. 25, 1966, now abandoned.

BACKGROUND OF THE INVENTION (1) Field of the invention.—The very corrosive lime-to-silica ratio ferruginous slags employed in the basic oxygen steelmaking furnaces and processes are one of the principal factors that have greatly limited the useful service life of refractories employed heretofore for working linings in such furnaces, especially the common commercial refractories such as tarbonded dolomites, tar-impregnated magnesites, and fused cast and bonded magnesite-chrome ore mixtures. As a result, operators of these steel-making furnaces have been seeking refractories for the working linings that are much more capable of withstanding these highly corrosive and erosive environments for longer periods of time so as to reduce one of the principal costs in the steelmaking operation and to provide greater efficiency in furnace operation.

(2) Description of the prior art.—Refractories of magnesia and zircon have been proposed heretofore for constructing glassmaking furnaces and regenerator checkers associated therewith. See British Patent 429,367 and U.S. Patent 3,192,059. The considerable amount of $SiO_2$ in such refractories, which forms a substantial quantity of silicate phase therein, contributes to their suitability for withstanding the siliceous, or chemically acid, environment of such glassmakng structures. However, this $SiO_2$ content of these same refractories renders them unsuitable for the chemically basic environment of the basic oxygen steelmaking furnaces because the highly basic slags and slag vapors readily corrode and penetrate the substantial areas of silicate phase in such refractories. The result is destruction of the refractories after only a short service life.

SUMMARY OF THE INVENTION

It is an object of this invention to provide a novel basic fused cast refractory that possesses a corrosion-erosion resistance in basic oxygen steelmaking environments greatly superior to that of the common commercial refractories used heretofore.

It is another object of this invention to provide a novel basic fused cast refractory that possesses a high degree of thermal shock resistance for withstanding the thermal stresses developed in refractory linings of steelmaking furnaces and the like.

It is a further object of this invention to provide a novel basic fused cast refractory having a high degree of refractoriness and a high degree of strength both before and after being subjected to fluctuating service temperatures as are experienced in steelmaking furnaces.

It is a still further object to provide a novel basic fused cast refractory having excellent resistance to hydration that greatly minimizes structural deterioration of the refractory during storage and shipment prior to use.

It is a still further object of a preferred form of this invention (as noted below) to provide a novel basic fused cast refractory possessing a high degree of hot strength.

The basic fused cast refractory according to this invention broadly consists of, analytically by weight, 1 to 30% $ZrO_2$, not more than 5% (beneficially, for basic corrosion resistance, less than 3%) $SiO_2$, 0 to 20% FeO, 0 to 10% $B_2O_3$, 0 to 3% of $Al_2O_3$, $Cr_2O_3$ and mixtures thereof, and the balance being MgO in an amount of at least 70% plus other incidental impurities. The MgO and $ZrO_2$ are the main esential constituents for forming the required crystalline structure having small isolated areas of zirconia dispersed between the greatly predominant periclase crystals, which predominance provides the considerable and essential amount of periclase-periclase bonding. These two oxide constituents can be employed alone when a particular application warrants the expense of very high purity raw materials. The $SiO_2$ and FeO in the limited amounts specified above give generally satisfactory properties while providing greater ease in melting of the batch materials; however, ordinarily they should be permitted beyond the limits of less than 3% by weight and 10% by weight, respectively, only when the refractory body is not employed in contact with molten basic slag. The $SiO_2$ forms generally isolated areas of silicate phase dispersed between periclase crystals, which areas become more isolated and smaller with decreased $SiO_2$ content. Limiting the FeO content is also important for minimizing permanent growth resulting from fluctuating service temperatures. Advantageously (e.g. for improving somewhat the hydration resistance and/or strength), the refractory can have a $B_2O_3$ content of 1 to 10% in place of some $ZrO_2$ content with about at least equally as good properties as the refractory containing no $B_2O_3$. Minor additions of $Al_2O_3$ and/or $Cr_2O_3$ are permissible up to a total of 3% by weight and can be advantageous in accommodating the use of less pure raw materials for MgO, $ZrO_2$, etc. and/or in providing some further improvement in corrosion-erosion resistance.

An especially desirable corrosion-erosion resistant fused cast refractory according to this invention consists of, analytically by weight, 4 to 10% $ZrO_2$, 0 to 5% (beneficially less than 3%) $SiO_2$, 0 to 10% FeO, 0 to 5% $B_2O_3$, 0 to 3% of $Al_2O_3$, $Cr_2O_3$ and mixtures thereof, and the balance being MgO in an amount of at least 80% plus other incidental impurities. The lower $SiO_2$ and FeO contents provide distinctly higher resistance to corrosion-erosion by high lime ferruginous slags, and preferably each of these oxides do not analytically exceed 1% by weight of the whole refractory.

A preferred form of the invention possessing the high degree of hot strength consists of, analytically by weight, 11 to 23% $ZrO_2$, 0 to 5% (beneficially less than 3%) $SiO_2$, 0 to 10% FeO, 0 to 5% $B_2O_3$, 0 to 3% of $Al_2O_3$, $Cr_2O_3$ and mixtures thereof, and the balance being MgO in an amount of at least 72% plus other incidental impurities. Keeping the $SiO_2$ and FeO contents low in this preferred form the same as noted above will also provide distinctly better resistance to corrosion-erosion.

Other incidental impurities are merely those extremely minor contaminants, besides the oxides mentioned above, resulting from the ordinary impurity contents of good grades of raw materials for MgO, $ZrO_2$, etc. (e.g., CaO impurity in commercially pure magnesia and $TiO_2$ in a commercial fused zirconia) the total of which should be less than 1% by weight of the whole refractory with CaO being less than 1% and $TiO_2$ being less than 0.2%. These requirements are important for avoiding the formation or increase of any crystalline phase detrimental to the above noted properties and structural characteristics.

As is conventional in the art of fused cast refractories, manufacture is readily done by melting a mixture of appropriate raw materials, for example, good commercial grades of calcined magnesia, of ordinary or fused zirconia, of zircon, of baddeleyite, and of anhydrous boric oxide. Because of the relatively high temperatures (e.g., 2000–2800° C.) that have to be generated for melting these compositions, conventional electric arc melting furnaces well known for this purpose are preferably employed. The raw batch materials are suitably proportioned to provide the desired final composition and preferably are premixed in granular form prior to charging into the melting furnace. After melting a sufficient amount of material, the molten mass is usually poured into preformed molds of suitable material (e.g., graphite, bonded sand, etc.) and allowed to cool and solidify therein to form monolithic block or casting according to common practice as is illustrated in United States Patent 1,615,750. Of course, the mold can also be the furnace container in which the melting is done, in which case the pouring step is omitted and the molten contents are allowed to solidify in that container. The mold may be of a size to form a single brick or block product or it may be larger to form a billet from which several bricks or block products can be cut.

DESCRIPTION OF THE PREFERRED EMBODIMENTS

By way of illustrating and providing a better appreciation of the present invention, the following detailed description and data are given concerning refractory samples, of the invention and of prior refractories, and their properties or characteristics.

The table below shows batch mixtures (in weight percent) that were melted in an electric arc furnace and corresponding chemical compositions (in weight percent) of the solidified blocks as calculated from the analyses of the oxide materials entering into the batch mixtures. All three examples in the table are fused cast refractory of this invention. The calcined magnesia employed had the following typical analysis, by weight: 98.51% MgO, 0.28% $SiO_2$, 0.22% $Fe_2O_3$, 0.86% CaO, 0.13% loss on ignition. The fused zirconia material had the following typical analysis, by weight: 85.03% $ZrO_2$, 4.36% $SiO_2$, 0.15% $Fe_2O_3$, 10.0% $Al_2O_3$, 0.28% CaO, 0.18% $TiO_2$.

vessel slag developed during the production of a heat of steel and had the following composition, by weight: 22% $Fe_3O_4$, 20% $SiO_2$, 39% CaO, 6% MgO, 3% $Al_2O_3$ and 10% $4CaO \cdot P_2O_5$. At the end of the test, the thickness of the samples in the area corroded-eroded by the slag is measured and compared with the original ½" thickness prior to testing. The results are expressed as a percentage change in thickness called "Percent Slag Cut."

With $ZrO_2$ contents in excess of 30%, the corrosion-erosion is radically lower than for compositions of this invention as shown in the table. Similar poor results in the same test procedure were found for several prior refractory products. Tar-bonded dolomite samples exhibited percent slag cuts of 100 (i.e., completely cut into two pieces). Tar-impregnated magnesite samples exhibited slag cuts of 70–100%. Slag cuts of 40–100% were found on samples of fused cast refractory made from a mixture of 55 wt. percent calcined magnesia and 45 wt. percent Transvaal chrome ore. A sample made from grain resulting from crushing the latter fused cast refractory and rebonding the grain by pressing and sintering at about 1600° C. yielded a slag cut of 100%. Hence, the greatly improved slag corrosion-erosion resistance of the present invention is readily apparent.

The thermal shock resistance date (T.S. cycles) was determined by a severe test in which 1" x 1" x 3" samples at room temperature are put into a furnace preheated to 1400° C., held in the furnace for 10 minutes to allow the samples to become uniformly heated, then pulled out into the air and held there for 10 minutes so that the samples become substantially cooled to room temperature. This procedure constitutes one cycle of the test and it is repeated until the samples failed by fracturing or spalling into two or more pieces, at which time the total number of cycles performed are noted.

In contrast to the excellent thermal shock resistance of this invention, samples of the above noted 55% magnesia-45% chrome ore fused cast refractory were able to withstand only 2–3 cycles in the same test.

The high degree of strength of the refractory of this invention, before and after subjection to thermal fluctuations is shown by the modulus of rupture (M.O.R.) values determined by conventional flexure test at room temperature. The thermal fluctuation procedure consisted of heating the samples up to 1250° C., and then repeatedly heating them to 1700° C. and cooling them to 1250° C. for six times before cooling back to room temperature for strength testing. The reported strength values are the average of two to three samples each.

Example Nos. 3–5 illustrates the preferred form of the

TABLE I

| Example No. | 1 | 2 | 3 | 4 | 5 |
|---|---|---|---|---|---|
| Calcined magnesia | 59 | 90 | 85 | 80 | 75 |
| Fused Zirconia | 5 | 10 | 15 | 20 | 25 |
| MgO | 93.70 | 88.77 | 83.83 | 78.88 | 73.96 |
| $ZrO_2$ | 4.26 | 8.51 | 12.77 | 17.03 | 21.29 |
| $SiO_2$ | 0.48 | 0.69 | 0.89 | 1.10 | 1.30 |
| FeO | 0.22 | 0.21 | 0.21 | 0.21 | 0.20 |
| $Al_2O_3$ | 0.50 | 1.00 | 1.50 | 2.00 | 2.50 |
| CaO | 0.83 | 0.80 | 0.77 | 0.74 | 0.71 |
| $TiO_2$ | 0.01 | 0.02 | 0.03 | 0.04 | 0.04 |
| Percent slag cut | 13 & 13 | 11 & 11 | 8 & 12 | | |
| T.S. cycles | 10 | 7 | | 15 | 12 |
| M.O.R. (p.s.i.) at R.T.: | | | | | |
| Before heating | 3.455 | | 6.337 | | |
| After heating | 7.350 | | 9.059 | | |
| M.O.R. (p.s.i.) at 1,340° C. | 1.200 | 1.500 | 8.100 | 3.900 | 3.800 |
| Hours to hydration failure | 273 | 273 | 273 | | |

The percent slag cut data shows the resistance to high lime-to-silica ratio ferruginous slag by the several examples and is based upon the test comprising placing 1½" x 1" x ½" samples in a gas-oxygen fueled furnace having an atmosphere adapted to approximate a basic oxygen vessel environment. At 1700° C. for about 3½ hours, the samples were passed, with one of their largest surfaces facing upward, through a downwardly directed stream of molten basic slag droplets at a substantially uniform rate of 60 times per hour until 2 kilograms of slag had been employed. The slag was representative of basic oxygen invention that possesses the high degree of hot strength, which is indicated in Table I by the modulus of rupture (M.O.R.) values obtained at 1340° C. by the conventional flexure testing of the samples while thoroughly heated to that temperature. In contrast, essentially pure fused MgO samples had hot strength values of only about 800 p.s.i.

The hydration test consisted of submerging the samples in boiling water until a piece of the sample flaked or spalled off or an open crack formed with a minimum opening width of at least 1/32", at which time the total number of hours of immersion were noted. From experience in using this test on a number of different basic refractories, it has been found that results of 100 or more hours to hydration failure indicate good resistance under ordinary commercial conditions.

An example of refractory of this invention containing $B_2O_3$ and that will give at least comparable properties to comparable examples not containing $B_2O_3$ is one made from a batch mixture of 90 wt. percent of the calcined magnesia, 5 wt. percent of the fused zirconia and 5 wt. of anhydrous boric oxide containing 98.9% $B_2O_3$. The calculated analysis of the resulting fused cast product is, by weight: 88.81% MgO, 4.26% $ZrO_2$, 0.47% $SiO_2$, 0.21% FeO, 4.95% $B_2O_3$, 0.50% $Al_2O_3$, 0.79% CaO and 0.01% $TiO_2$.

We claim:

1. A fused cast refractory consisting of, analytically by weight, 1 to 30% $ZrO_2$, not more than 5% $SiO_2$, 0 to 20% FeO, 1 to 10% $B_2O_3$, 0 to 3% of $Al_2O_3$, $Cr_2O_3$ and mixtures thereof, and the balance being MgO in an amount of at least 70% plus incidental impurities in an amount less than 1%.

2. A fused cast refractory consisting of, analytically by weight, 1 to 30% $ZrO_2$, less than 3% $SiO_2$, 0 to 20% FeO, 0 to 10% $B_2O_3$, 0 to 3% of $Al_2O_3$, $Cr_2O_3$ and mixtures thereof, and the balance being MgO in an amount of at least 70% plus incidental impurities in an amount less than 1%.

3. The fused cast refractory of claim 2 wherein the $ZrO_2$ is 4 to 10%, the FeO is 0 to 10%, the $B_2O_3$ is 0 to 5% and the MgO is at least 80%.

4. The fused cast refractory of claim 3 wherein the FeO is 0 to 1% and the $SiO_2$ is 0 to 1%.

5. The fused cast refractory of claim 3 wherein the $B_2O_3$ is 1 to 5%.

6. The fused cast refractory of claim 2 wherein the $ZrO_2$ is 11 to 23%, the FeO is 0 to 10%, the $B_2O_3$ is 0 to 5% and the MgO is at least 72%.

7. The fused cast refractory of claim 6 wherein the FeO is 0 to 1% and the $SiO_2$ is 0 to 1%.

8. The fused cast refractory of claim 6 wherein the $B_2O_3$ is 1 to 5%.

FOREIGN PATENTS 429,367  5/1935  Great Britain.

JAMES E. POER, *Primary Examiner.*

U.S. Cl. X.R.

106—58